United States Patent Office 3,438,788
Patented Apr. 15, 1969

3,438,788
SARAN COATING OF FILLED RIGID PLASTIC CONTAINERS
Maurice J. Gifford and Oscar E. Seiferth, Madison, Wis., assignors to Oscar Mayer & Company, Inc., Chicago, Ill., a corporation of Illinois
No Drawing. Filed Mar. 30, 1966, Ser. No. 538,552
Int. Cl. B67b *5/04;* B65b *25/02*
U.S. Cl. 99—171                                6 Claims

ABSTRACT OF THE DISCLOSURE

Food packages formed in substantial part with a preformed clear plastic container portion are treated with a coating of saran latex emulsion or saran solution and then dried so as to form a continuous coating over the clear plastic, which coating constitutes an oxygen barrier. The saran coating may be applied in several ways but preferably is applied by dipping. Desirably, the heat of the contents of the container are relied upon to provide the heat required to dry the saran coating. No primer coating is required when the containers are formed from polycarbonate resin or from polyvinyl chloride base resin. With other resins it is usually desirable to employ a primer coat to obtain improved adhesion of the saran latex emulsion or solution coating.

---

This invention relates, generally, to improvements and innovations in forming hermetically sealed food packages each of which is formed at least in substantial part with a pre-formed clear plastic container portion which either (1) does not have adequate resistance to oxygen permeability unless treated in accordance with the present invention, or (2) which will have substantially improved resistance to oxygen penetration when so treated. The invention relates both to the method of treating such hermetically sealed food packages and also to the treated packages themselves.

Pre-formed, self-sustaining clear plastic containers are available having varying degrees of rigidity which are capable of being used commercially over a wide range of temperatures during filling with food products and subsequent sealing but which do not have adequate resistance to oxygen permeability. It has previously been proposed to apply oxygen resistant coatings to plastic sheets before container elements are formed therefrom. However, when this is done either damage is very likely to occur to the coatings during the forming process or great care must be exercised during formation thereby adding materially to the production costs. Unless any such coatings which are applied remain completely continuous without being broken or damaged in any spot or location, the package will not have adequate resistance to penetration by oxygen from the air and its shelf-life will be inadequate or substantially shortened.

By way of illustration of the type of packages to which the present application has relation, reference is made to the following patents and applications which disclose hermetically sealed food packages the container portions of which are comprised of pre-formed clear plastic cup-like portions, the open ends or sides of which are hermetically sealed with metal or plastic lids or covers: Seiferth and Austin No. 3,070,446, Dec. 25, 1962; Heing and Fourier No. 3,087,823, Apr. 30, 1963; Seiferth et al., Ser. No. 445,579, filed Apr. 5, 1965; and Seiferth et al., Ser. No. 389,756 filed Aug. 14, 1964 issued June 20, 1967 as Patent 3,326,699.

The plastic cup or plastic container portions of the packages of the type shown in the above mentioned patents and applications may be formed from various clear plastics of known type including: polycarbonate, vinyl chloride, polystyrene, nylon, cellulose acetate, polyethylene and Mylar resins. These resins are all available in food grades and have different degrees of resistance to penetration by oxygen in the air. They may be inexpensively molded by various known techniques and equipment into self-sustaining, semi-rigid container members which will adequately withstand handling during filling and sealing and subsequent handling incidental to packing for shipment and display on a shelf or in a refrigerator case.

Container elements formed of the above-mentioned resins or plastic materials are either deficient in their ability to resist penetration by oxygen from the air, or they can be made more valuable if such resistance is improved. Therefore, such containers or container elements can be greatly improved when they are treated in accordance with the present invention so as to receive a protective coating which is highly resistant to oxygen penetration.

The object of the present invention, generally stated, is a method of treating filled and hermetically sealed packages formed at least in substantial part with a preformed clear plastic container portion so as to impart adequate or improved resistance to oxygen permeability, the treatment consisting of depositing a coating of saran latex emulsion or saran solution on such plastic containers and drying the emulsion or solution to form a continuous impervious coating.

A further object of the invention is treatment of plastic container portions in accordance with the foregoing object wherein the saran coating is deposited by dipping or immersing the packages in a bath of saran latex emulsion or solution and removing the same therefrom so as to leave a driable residual coating or deposit.

Still another object is treatment of the plastic containers in accordance with the above mentioned objects in which the packages are first filled with hot food and the heat of the food is relied on to at least a substantial extent to accomplish the necessary drying of the adherent coating.

Certain other objects of the invention will in part be obvious and will in part appear hereinafter.

For a more complete understanding of the nature and scope of the invention, reference may now be had to the following detailed description thereof including an example of a preferred embodiment.

Example

Clear plastic container cups which are 1⅛ inches deep, 3⅞ inches in diameter and have outwardly turned flanges of a width of ¹⁄₁₆ inch are molded from polycarbonate resin so as to have a thickness of approximately .010 inch. These container elements are filled with hot sandwich spread at a temperature of approximately 185° F. Metal lids are then applied and hermetically sealed to the flange as described for example in the above mentioned Patent No. 3,070,446. Promptly after the packages have been so hermetically sealed, at least the plastic cup portions thereof, and preferably the entire packages, are dipped in saran latex emulsion heated to a temperature of 80° F. and having a solids content of 60% by weight. Saran latex emulsions of known type suitable for providing oxygen resistance coatings on plastic are obtainable commercially, from several sources in this country. One saran latex dip which has been used successfully was a copolymer latex of polyvinylidene chloride and copolymerizable monomers.

After each package is removed from the saran latex bath excess latex is blown off by a light air blast or otherwise removed and the residual heat within the package will be sufficient to dry the coating within about 15 seconds.

Preferably a production line is set up wherein the packages are filled, sealed, conveyed through the bath of saran latex and out under the air blast to a place where they are removed for packing in corrugated paper board cartons or other suitable shipping containers.

A number of changes and variations may be made in the foregoing example as follows:

(1) The solids content of the saran latex bath may be varied such as between 20 to 60% solids with the thickness of the coating being directly proportional to the solids content.

(2) If the residual heat of the contents of the package is not sufficient, or if it is desired to speed up the drying step, the dipped packages can be passed under radiant infra-red heaters or under blasts of hot air.

(3) Various food products can be packaged including cheese products, dips and also sliced meats. If the products are cold or do not have sufficient residual heat any suitable auxiliary means can be used for drying the saran latex coating.

(4) The plastic cup containers may be formed of other resins including polycarbonate, polyvinyl chloride, nylon, cellulose acetate, polyethylene, polypropylene or Mylar resins.

(5) When the containers are formed of resins other than polycarbonate or polyvinyl chloride base resins, a primer coat can be used to advantage to obtain better adhesion of the saran oxygen barrier coat. While the primer coats may be applied directly to the filled containers by the dipping and drying technique they may be advantageously applied to plastic sheets by standard coating methods prior to thermoforming or otherwise forming the containers. Even if the primer coats are not completely continuous or become somewhat impaired as a result of forming, this will not detract from their function as primers. Various known primers may be used, for example polyester resin dissolved in a volatile organic solvent and reacted with an isocyanate.

(6) Saran solutions may be used instead of the saran latex emulsions into which the then filled containers may be dipped to receive the exterior saran oxygen barrier coats. For example 15% by weight of saran may be dissolved in a volatile solvent comprised of about 65 parts of methyl ethyl ketone and about 34 parts of toluene. Saran resins such as vinylidene chloride-acrylonitrile copolymers have been used satisfactorily.

We claim:

1. The method of treating a filled food package formed at least in substantial part with a pre-formed self-sustaining clear plastic container portion, so as to impart substantially increased resistance to oxygen permeability to said container portion, which comprises, depositing a coating of saran latex emulsion or saran solution thereon and drying the said latex or solution to form a continuous coating which constitutes an oxygen barrier.

2. The method called for in claim 1 wherein at least said plastic container portion of said food package is dipped into a bath of saran latex emulsion or saran solution so as to deposit said coating thereon.

3. The method called for in claim 1 wherein said plastic container portion is filled with hot food when said coating of saran latex emulsion or saran solution is deposited on said container and the heat of said food is relied on to accomplish at least a substantial part of the drying action.

4. The method of claim 1 wherein said plastic container portion is formed of polycarbonate resin.

5. The method of claim 1 wherein said plastic container portion is formed of polyvinyl chloride base resin.

6. The method of claim 1 wherein said plastic container portion is provided with a primer coat to provide improved adhesion of the exterior saran coat.

References Cited

UNITED STATES PATENTS

| | | | |
|---|---|---|---|
| 3,240,611 | 3/1966 | Williams | 99—181 |
| 2,401,038 | 5/1946 | Barton et al. | 206—46 |
| 2,849,320 | 8/1958 | Weinmann et al. | 99—169 |
| 2,985,542 | 5/1961 | Pinsky et al. | 117—138.8 |
| 3,222,188 | 12/1965 | Feldman | 99—171 |
| 3,328,196 | 6/1967 | Sincock | 117—76 |

OTHER REFERENCES

Modern Plastics Encyclopedia for 1964, p. 647 (Oct. 15, 1963).

LIONEL M. SHAPIRO, *Primary Examiner.*

U.S. Cl. X.R.

53—131; 99—174; 215—1